United States Patent
Foskett

(10) Patent No.: US 9,173,084 B1
(45) Date of Patent: Oct. 27, 2015

(54) SYSTEMS, METHODS AND MEDIA FOR ENHANCED CIRCUIT-SWITCHED FALLBACK INTERWORKING FUNCTION SIGNALING PROCEDURES FOR ROAMING USER EQUIPMENT

(71) Applicant: Cisco Technology, Inc., San Jose, CA (US)

(72) Inventor: Brian Foskett, Tyne and Wear (GB)

(73) Assignee: CISCO TECHNOLOGY, INC., San Jose, CA (US)

(*) Notice: Subject to any disclaimer, the term of this patent is extended or adjusted under 35 U.S.C. 154(b) by 68 days.

(21) Appl. No.: 14/011,857

(22) Filed: Aug. 28, 2013

Related U.S. Application Data

(60) Provisional application No. 61/849,835, filed on Mar. 7, 2013.

(51) Int. Cl.
| | |
|---|---|
| *H04L 12/66* | (2006.01) |
| *H04W 8/04* | (2009.01) |
| *H04W 36/00* | (2009.01) |

(52) U.S. Cl.
CPC ............ *H04W 8/04* (2013.01); *H04W 36/0022* (2013.01)

(58) Field of Classification Search
CPC ... H04W 8/245; H04W 76/023; H04W 8/005; H04W 36/22; H04B 10/501; H04L 65/1069; H04L 61/20
USPC .......... 455/433, 445; 370/352, 338, 353, 389, 370/467, 522
See application file for complete search history.

(56) References Cited

U.S. PATENT DOCUMENTS

| | | | |
|---|---|---|---|
| 2010/0135206 A1* | 6/2010 | Cherian et al. | 370/328 |
| 2010/0285797 A1* | 11/2010 | Ghai et al. | 455/426.1 |

FOREIGN PATENT DOCUMENTS

| | | | | |
|---|---|---|---|---|
| WO | WO 2012/045377 A1 * | 4/2012 | | H04W 76/02 |
| WO | WO 2012/162636 A1 * | 11/2012 | | H04W 8/04 |

OTHER PUBLICATIONS

3GPP TS 23.272 version 11.3.0 Release 11 (Jan. 2013).*
Axel Kupper, Location-based Services: Fundamentals and Operation, 2005, John Wiley & Sons, Chapter 5: Cellular Networks and Location Management.*

* cited by examiner

*Primary Examiner* — Phuoc H Doan
(74) *Attorney, Agent, or Firm* — Patent Capital Group

(57) ABSTRACT

Systems, methods and media for enhanced voice call procedures are provided. A method for enhanced voice call procedure includes receiving at a CSFB-IWF a request to provide routing information for a UE for which an incoming voice call is received. The request is received from an HLR and includes a UE identifier. The UE is operating in an LTE network. The method also includes sending a page along with a TMSI for the UE to an MME in the LTE network that can locate the UE along with the TMSI. The page signal causes the UE to switch to a legacy (3G) network. The method further includes detecting an MSC hosting the UE that is located in the legacy network. The method also includes receiving an MSRN for the UE from the hosting MSC and sending to the HLR a message including the MSRN in response to the request.

21 Claims, 10 Drawing Sheets

SYSTEMS, METHODS AND MEDIA FOR ENHANCED CIRCUIT-SWITCHED FALLBACK INTERWORKING FUNCTION SIGNALING PROCEDURES FOR ROAMING USER EQUIPMENT

CROSS REFERENCE TO RELATED APPLICATION

This application claims the benefit under 35 U.S.C. §119 (e) of U.S. Provisional Patent Application Ser. No. 61/849,835, filed Mar. 7, 2013, which is hereby incorporated by reference herein in its entirety.

FIELD OF THE DISCLOSURE

This disclosure relates generally to systems, methods and media for enhancing voice call procedures for roaming user equipment (UE). In particular, enhanced circuit-switched fallback (CSFB) interworking function (IWF) signaling procedures for terminating (incoming) voice calls can prevent messages from being filtered out by a foreign network that provides roaming services to a user equipment (UE).

BACKGROUND

Wireless networks are telecommunication networks that use radio waves to carry information from one node in the network to one or more receiving nodes in the network. Cellular telephony is characterized by the use of radio cells that provide radio coverage for a geographic area, with multiple cells arranged to provide contiguous radio coverage over a larger area. Wired communication can also be used in portions of a wireless network, such as between cells or access points.

Wireless communication technologies are used in connection with many user equipment, including, for example, satellite communications systems, portable digital assistants (PDAs), laptop computers, and mobile devices (e.g., cellular telephones). One benefit that users of such devices can obtain is the ability to connect to a network (e.g., the Internet) as long as the user is within range of such a wireless communication technology. Current wireless communication systems use either, or a combination of, circuit switching and packet switching in order to provide mobile data services to mobile devices. Generally speaking, with circuit-based approaches, wireless data is carried by a dedicated (and uninterrupted) connection between the sender and recipient of data using a physical switching path. Packet-based approaches, on the other hand, do not permanently assign transmission resources to a given session, and do not require the set-up and tear-down of physical connections between a sender and receiver of data. In general, a data flow in packet-based approaches is divided into separate segments of information or packets. The data flow may include a number of packets or a single packet.

DESCRIPTION OF EXAMPLE EMBODIMENTS

Overview

Figure 1:
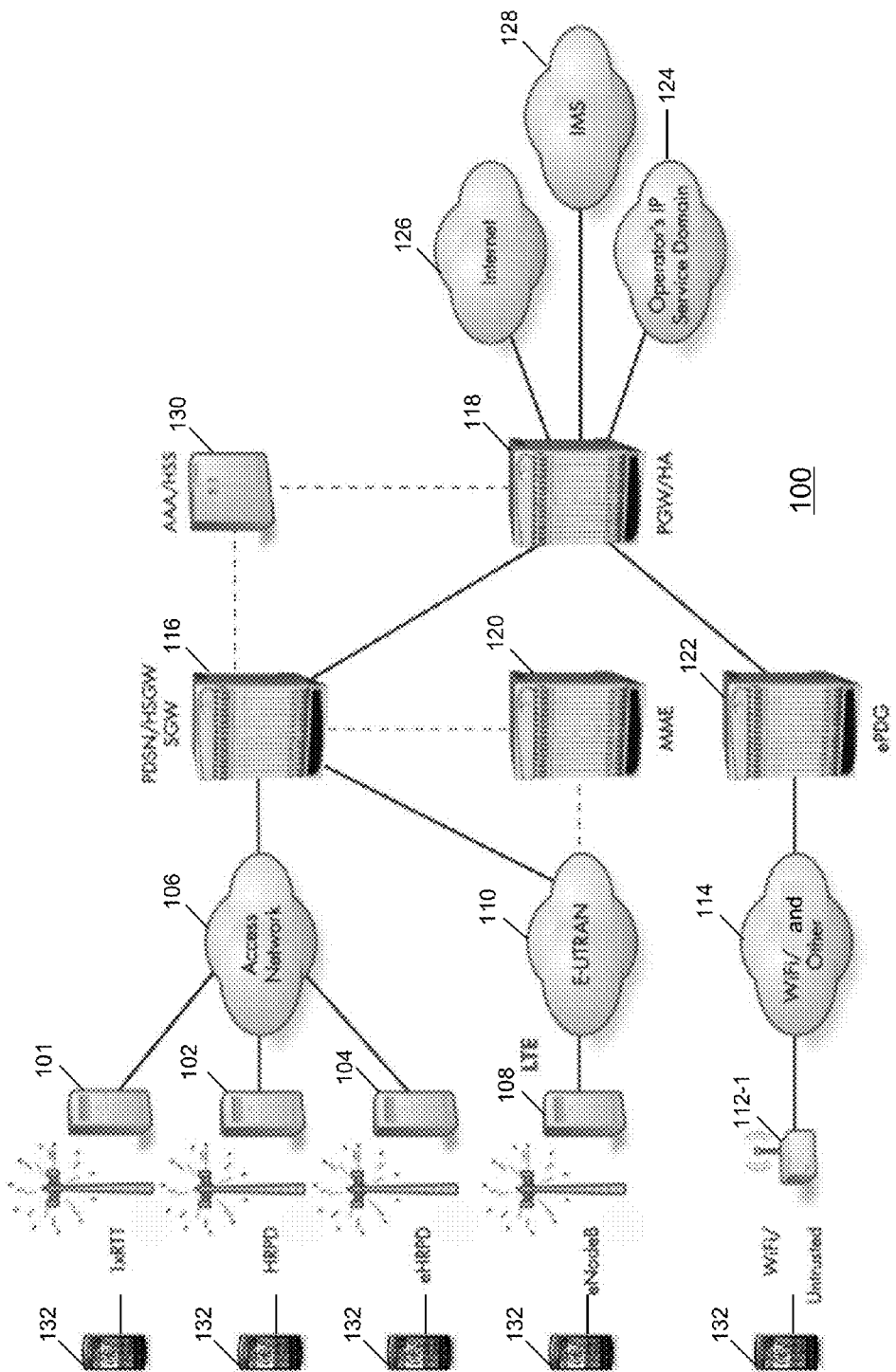
FIGS. 1-2 illustrate a communication network including a long term evolution (LTE) topology in accordance with certain embodiments.

Certain embodiments disclose a method that includes receiving at a circuit-switched fallback interworking function (CSFB-IWF) a request to provide routing information for a user equipment (UE) for which an incoming voice call is received. The request is received from a home location register (HLR) and includes an identifier of the UE. The UE is operating in a long term evolution (LTE) network. The method also includes sending from the CSFB-IWF a page signal along with a temporary mobile subscriber identity (TMSI) for the UE to a mobility management entity (MME) in the LTE network that can locate the UE. The TMSI is allocated for the UE when the UE attaches to the LTE network. The page signal causes the UE to switch to a legacy network, including a 3G network. The method further includes detecting at the CSFB-IWF a mobile switching center (MSC), which hosts the UE and is located in the legacy network, and receiving at the CSFB-IWF a mobile station roaming number (MSRN) for the UE from the hosting MSC. The method also includes sending from the CSFB-IWF to the HLR a first message including the MSRN in response to the request such that the MSRN can be used to route the incoming voice call to the UE.

Certain embodiments disclose a network device that includes a network device comprising a processor and a memory capable of storing data. The processor is configured for using the data such that the network device can receive from a home location register (HLR) a request to provide routing information for a user equipment (UE) for which an incoming voice call is received. The request includes an identifier of the UE, which is operating in a long term evolution (LTE) network. The network device can also send a page signal along with a temporary mobile subscriber identity (TMSI) for the UE to a mobility management entity (MME) in the LTE network that can locate the UE. The TMSI is allocated for the UE when the UE attaches to the LTE network. The page signal causes the UE to switch to a legacy network, including a 3G network. The network device can further detect a mobile switching center (MSC), which hosts the UE and is located in the legacy network, and receive a mobile station roaming number (MSRN) for the UE from the hosting MSC. The network device can also send to the HLR a first message including the MSRN in response to the request such that the MSRN can be used to route the incoming voice call to the UE.

Certain embodiments disclose a computer program product residing on a non-transitory computer-readable medium. The computer program product includes computer executable code which, when executed by one or more processors, causes the one or more processors to perform a method. The method includes receiving at a circuit-switched fallback interworking function (CSFB-IWF) a request to provide routing information for a user equipment (UE) for which an incoming voice call is received. The request is received from a home location register (HLR) and includes an identifier of the UE. The UE is operating in a long term evolution (LTE) network. The method also includes sending from the CSFB-IWF a page signal along with a temporary mobile subscriber identity (TMSI) for the UE to a mobility management entity (MME) in the LTE network that can locate the UE. The TMSI is allocated for the UE when the UE attaches to the LTE network. The page signal causes the UE to switch to a legacy network, including a 3G network. The method further includes detecting at the CSFB-IWF a mobile switching center (MSC), which hosts the UE and is located in the legacy network, and receiving at the CSFB-IWF a mobile station roaming number (MSRN) for the UE from the hosting MSC. The method also includes sending from the CSFB-IWF to the HLR a first message including the MSRN in response to the request such that the MSRN can be used to route the incoming voice call to the UE.

Example Embodiments

The disclosed systems, methods and media are provided for enhanced voice call procedures for roaming user equipment using switched-fallback function. The enhanced voice call procedures support a mechanism for retrieving a mobile station roaming number (MSRN) for a roaming subscriber device without requiring signaling interactions across network boundaries. In particular, an enhanced mobile terminating (incoming) voice call procedure can prevent messages (e.g., send-routing-information (SRI) message) from being filtered out by a foreign network that provides roaming services to a user equipment (UE).

FIG. 1 illustrates a communication system 100 with parallel networks in accordance with certain embodiments. FIG. 1 includes a number of radio access technologies such as a 1xRTT transceiver 101, a high-rate packet data (HRPD) transceiver 102, and an evolved high-rate packet data (eHRPD) transceiver 104, each of which can connect to an access network 106. An Evolved Node B (eNodeB) transceiver 108 is an LTE network radio network component that connects to an Evolved UMTS Terrestrial Radio Access Network (E-UTRAN) 110. Other radio access technologies such as Wireless Local Area Network (i.e., Wi-Fi), WiMAX, or any other radio spectrum technology 114, can use a transceiver shown generally at 112-1 to connect a user equipment (UE) 132 to the network using a broadband or other access network.

The access network 106 can communicate with an access gateway 116 that implements a combination of functionalities such as a packet data serving node (PDSN), a HRPD serving gateway (HSGW), and a serving gateway (SGW). In operation, the PDSN functionality can be used with 1xRTT 100, the HSGW functionality can be used with HRPD 102 and eHRPD 104, and the SGW functionality can be used with the eNodeB 108. The access gateway 116 can communicate with an anchor gateway 118, which can implement a packet data network gateway (PGW) and a Home Agent (HA), and a mobility management entity (MME) 120. On the access network side, the anchor gateway 118 can also communicate with an evolved packet data gateway (ePDG) 122 that provides connectivity to the WLAN/other transceiver 112-1. On the packet core side, the anchor gateway can communicate with the operator's IP service domain 124, the Internet 126, and IP multimedia subsystem (IMS) 128. An authentication, authorization, and accounting (AAA) server/home subscriber server (HSS) 130 can communicate with the access gateway 116, the anchor gateway 118, or both.

The Home Subscriber Server (HSS) 130 can be a master user database that supports IMS network entities that handle calls. The HSS 130 stores subscription-related information (subscriber profiles), performs authentication and authorization of the user, and can provide information about the subscriber's location and IP information. The HSS 130 also maintains binding information on which gateway is currently serving a UE. Even when the UE 132 is detached from the network, the HSS 130 maintains the binding information until the UE 132 re-attaches itself and updates the binding information. The AAA server 130 can provide authentication, access control, and accounting to the network. The authentication can involve verification of the subscriber, the access control can involve granting or denying access to specific services, and the accounting that can take place is the tracking of the use of network resources by subscribers. Other servers, such as the Home Location Register (HLR) can be used in other embodiments. In certain embodiments, the AAA/HSS 130 can communicate with the access gateway 116 for charging purposes.

The LTE communication network includes a PDN gateway (PGW) 118, a serving gateway (SGW) 116, an E-UTRAN (evolved-UMTS terrestrial radio access network) 110, and a mobility management entity (MME) 120. The evolved packet core (EPC) of an LTE communication network includes the MME 120, SGW 116 and PGW 118 components. In some embodiments, one or more EPC components can be implemented on the same gateway or chassis as described below.

The SGW 116 sits in the user plane where it forwards and routes packets to and from the eNodeB 108 and PGW 118. The SGW 116 also serves as the local mobility anchor for inter-eNodeB handover and mobility between 3GPP networks. The SGW 116 routes and forwards user data packets, while also acting as the mobility anchor for the user plane during inter-eNB handovers and as the anchor for mobility between LTE and other 3GPP technologies (terminating S4 interface and relaying the traffic between 2G/3G systems and PGW 118). For idle state UEs 132, the SGW 116 terminates the down link data path and triggers paging when down link data arrives for the UE 132. The SGW 116 manages and stores UE contexts, e.g. parameters of the IP bearer service and network internal routing information. The SGW 116 also performs replication of the user traffic in case of lawful interception.

The PGW 118 acts as the interface between the LTE network and other packet data networks, such as the Internet 126 or SIP-based IMS networks 128 (fixed and mobile). The PGW 118 serves as the anchor point for intra-3GPP network mobility, as well as mobility between 3GPP and non-3GPP networks. The PGW 118 acts as the Policy and Charging Enforcement Function (PCEF), which manages Quality of Service (QoS), online/offline flow-based charging data generation, deep-packet inspection, and lawful intercept. The PGW 118 provides connectivity to the UE 132 to external packet data networks by being the point of exit and entry of traffic for the UE 132. A UE may have simultaneous connectivity with more than one PGW for accessing multiple packet data networks. The PGW 118 performs policy enforcement, packet filtering for each user, charging support, lawful interception, and packet screening. The PGW 118 also provides an anchor for mobility between 3GPP and non-3GPP technologies such as WiMAX and 3GPP2 standards (CDMA 1X and EVDO).

The MME 120 resides in the Evolved Packet Core (EPC) control plane and manages session states, authentication, paging, mobility with 3GPP 2G/3G nodes, roaming, and other bearer management functions. The MME 120 can be a standalone element or integrated with other EPC elements, including the SGW 116, PGW 118, and Release 8 Serving GPRS Support Node (SGSN). The MME 120 can also be integrated with 2G/3G elements, such as the SGSN and GGSN. This integration is the key to mobility and session management interworking between 2G/3G and 4G mobile networks.

The MME 120 is a control-node for the LTE access network. The MME 120 is responsible for UE tracking and paging procedures including retransmissions. The MME 120 handles the bearer activation/deactivation process and is also responsible for choosing the SGW 116 for a UE 132 at the initial attachment and at time of an intra-LTE handover as well as selecting an appropriate PGW (e.g., PGW 118). The MME 120 also authenticates the user by interacting with the HSS 130. The MME 120 also generates and allocates temporary identities to UEs 132 and terminates Network Access Server (NAS) signaling. The MME 120 checks the authorization of the UE 132 to camp on the service provider's Public Land Mobile Network (PLMN) and enforces UE roaming restrictions. The MME 120 is the termination point in the network for ciphering/integrity protection for NAS signaling and handles the security key management. Lawful interception of signaling is also supported by the MME 120. The MME 120 also provides the control plane function for mobility between LTE and 2G/3G access networks with the S3 interface terminating at the MME 120 from the SGSN (not shown). The MME 120 also terminates the S6a interface towards the home HSS 130 for roaming UEs 132.

Typically, the Evolved Node B (eNodeB) is statically configured with the Internet Protocol (IP) addresses of the S1 Application Part (S1AP) interface of one or more mobility management entities (MMEs). On power-up, the eNodeB establishes an S1AP connection to each configured MME's S1AP interface. For the selection of a particular MME during, e.g., International Mobile Subscriber Identity (IMSI)-based Initial Attach procedure, the eNodeB currently only considers the current load factor of the MMEs having an active S1AP connection—i.e., the current MME selection algorithm only takes into account the current load factor of the connected MMEs. The eNodeB simply assumes that all MMEs within an MME pool have the same capabilities/functionalities and thus does not allow selection of MMEs based on the service/communications session type requested by user equipment and the service/communications session type supported by the MMEs.

The ePDG 122 is responsible for interworking between the EPC and fixed untrusted non-3GPP access technologies such as a WLAN access networks. The ePDG 122 can use IPSec/IKEv2 to provide secure access to the EPC network. Optionally, the ePDG 122 can use Proxy Mobile IPv6 (PMIPv6) to interact with the PGW 118 when the mobile subscriber is roaming in an untrusted non-3GPP system. The ePDG 122 is involved in tunnel authentication and authorization, transport level packet marking in the uplink, policy enforcement of Quality of Service (QoS) based on information received via Authorization, Authentication, Accounting (AAA) infrastructure, lawful interception, and other functions.

Figure 2:
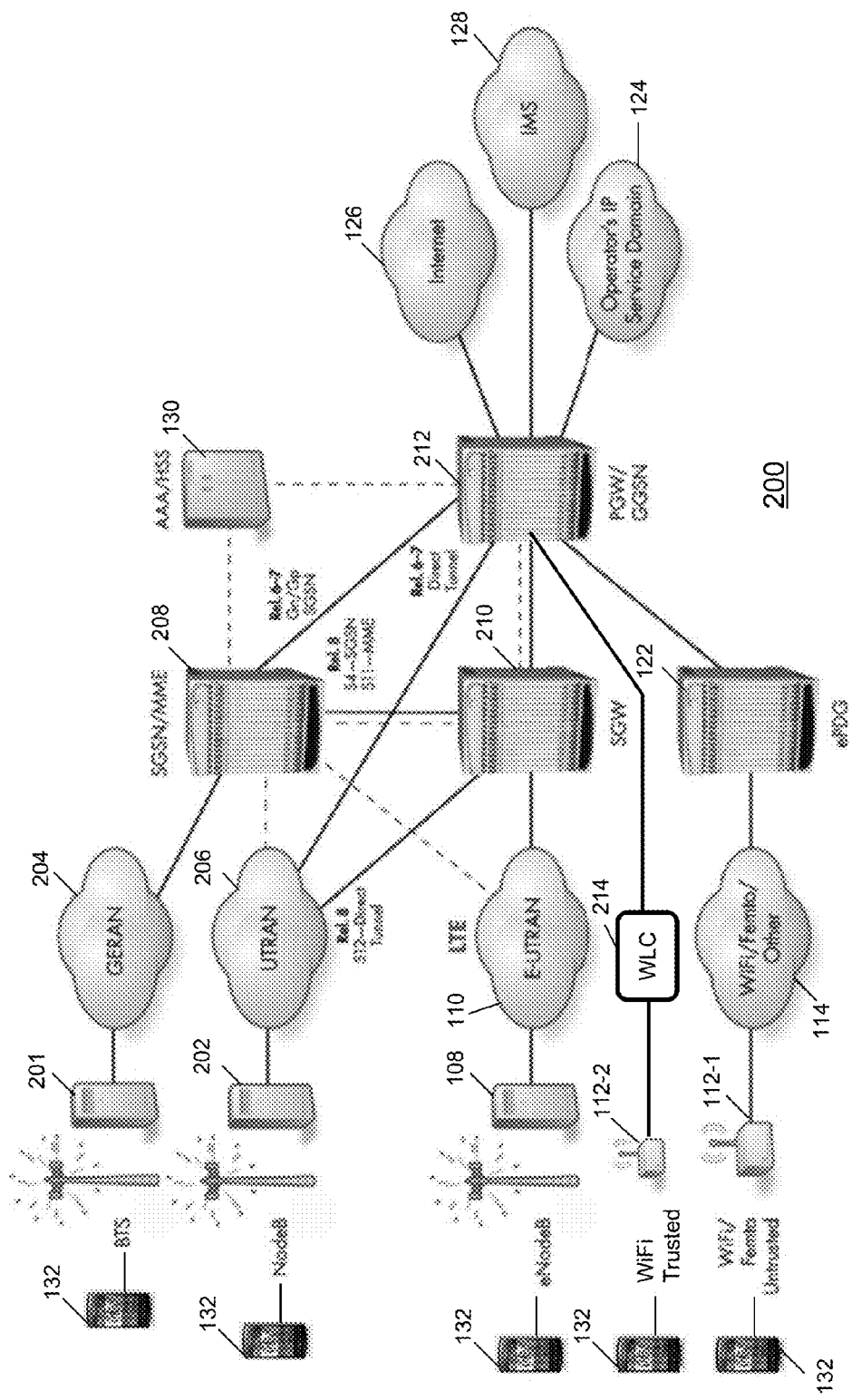

FIG. 2 illustrates a communication system 200 with parallel networks in accordance with legacy universal mobile telecommunications systems (UMTS) network devices in accordance with certain embodiments. The legacy transceivers include base transceiver station (BTS) 201 and NodeB transceiver 202. The BTS 201 can communicate with a GSM EDGE Radio Access Network (GERAN) 204 and the NodeB 202 can communicate with a UMTS terrestrial radio access network (UTRAN) 206. The serving GPRS support node (SGSN) can be implemented on a gateway 208 with a mobility management entity (MME). The GERAN 204 can communicate through the SGSN functionality on gateway 208 to serving gateway (SGW) 210 or gateway GPRS support node (GGSN)/PGW 212. UEs 132 can receive data service via a trusted WLAN network. The trusted WLAN can include an access point (AP) 112-2 and a WLAN controller (WLC) 214.

In some embodiments, the efficient mechanism for balancing data load across parallel communication networks can be implemented on gateways, such as PGW/HA 118, PDSN/HSGW/SGW 116, SGSN/MME 208, PGW/GGSN 212, or SGW 210. The gateways can access and maintain information relating to the communication session, the subscriber, the radio bearers, and the policies relating to the communication session. The gateways may be used to provide various services to a UE 132 and implement the quality of service (QoS) on packet flows. Several of these functions are used in providing, for example, voice over IP (VoIP) routing and enhanced services, such as enhanced charging, stateful firewalls, and traffic performance optimization (TPO). The communication networks also allow provision of applications such as VoIP, streaming video, streaming music, multi-user gaming, location based services, and a variety of delivered to a mobile node. Residing within the gateways can be one or more network processing units, line cards, as well as packet and voice processing cards.

Figure 3A:
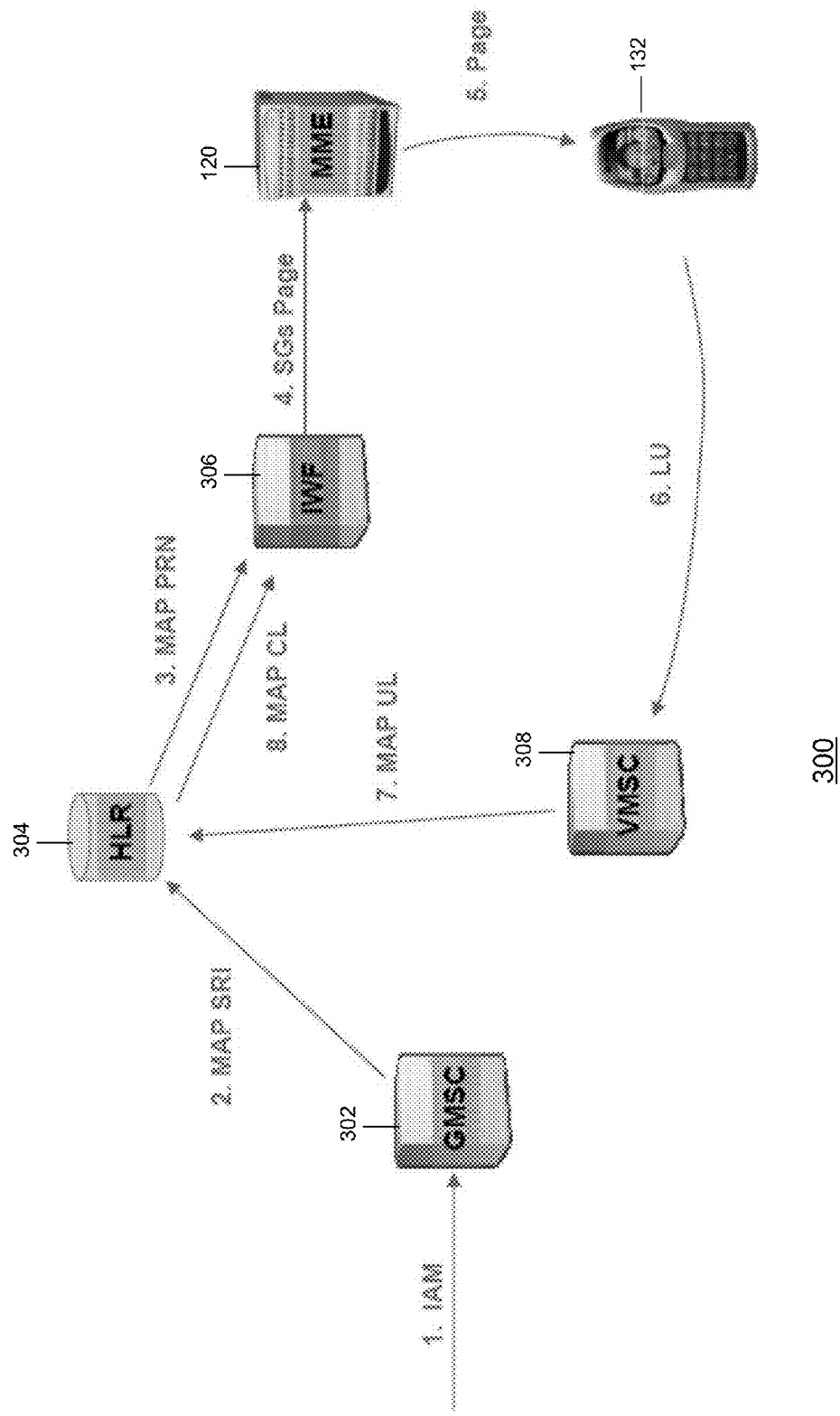
FIGS. 3A-3B show a block diagram for illustrating a mobile terminating (incoming) voice call procedure.
Figure 3B:
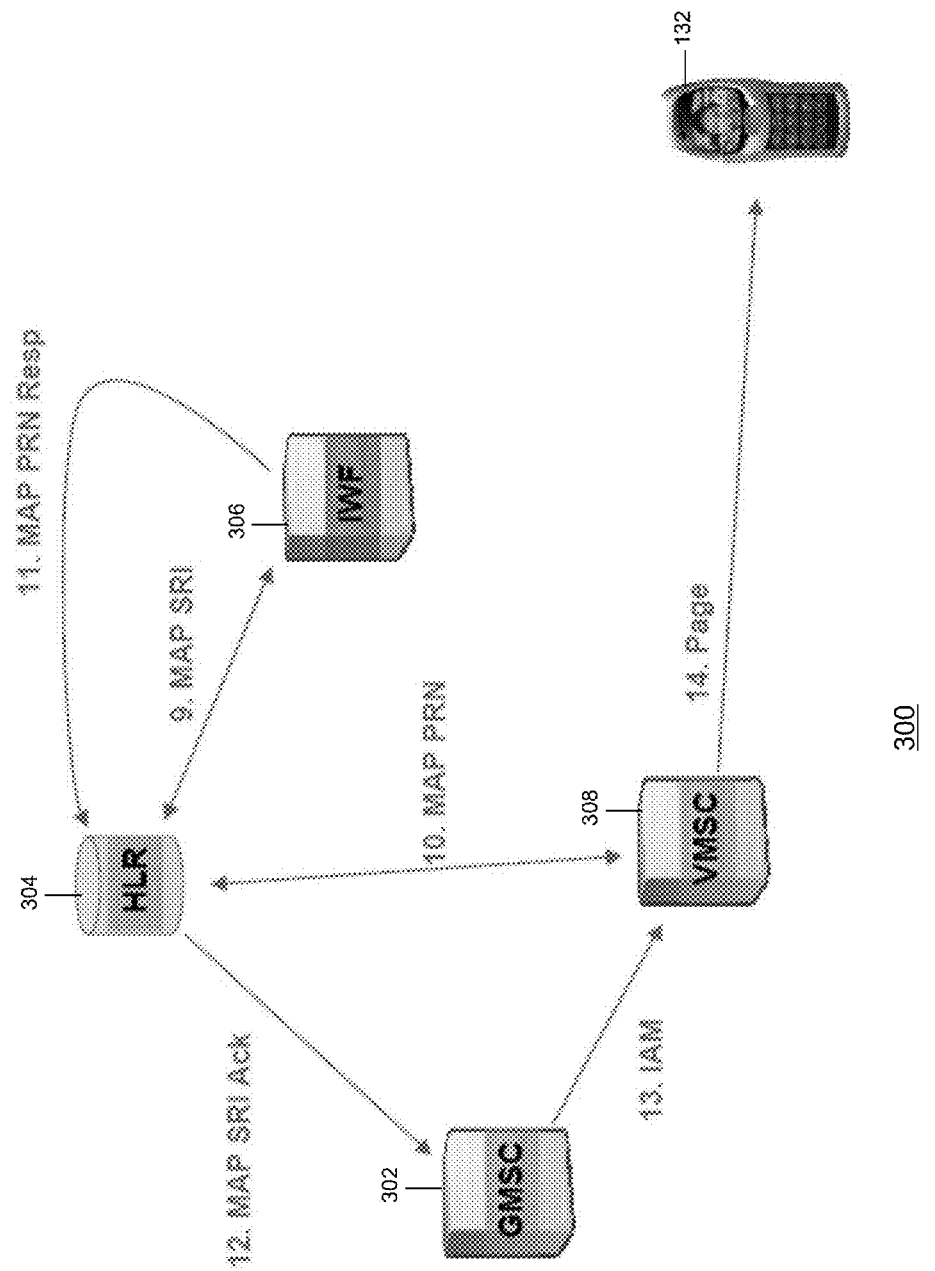

FIGS. 3A-3B show a block diagram 300 for illustrating a mobile terminating (incoming) voice call procedure using the circuit-switched fallback (CSFB) interworking function (IWF). CSFB function refers to a mechanism (or a device/apparatus implementing the mechanism) that enables voice services using circuit-switched (CS) domain functions to be provided to a user equipment that is attached to a long term evolution (LTE) network that does not yet provide voice over IP (VoIP) services. In general, the CSFB network architecture encompasses the legacy 2G/3G network and the LTE network that co-exist in mixed networks. The legacy 2G/3G network and the LTE network reside between the UE and the common core network, where a mobility management entity (MME) serves UE for LTE access, a serving GPRS supporting node (SGSN) serves UE for 2G/3G data services and a mobile switching center (MSC) server serves UE for 2G/3G voice services. To support the circuit-switched fallback architecture, the CSFB function bridges MME and the circuit network, thereby providing signaling paths from the legacy network to the LTE network. For example, an SGs interface configured for communication between the CSFB-IWF and the MME can enable the UE to be registered for both circuit-switched (CS) services and packet-switched (PS) services while on the LTE access network. The SGs interface also enables the delivery of CS pages via the LTE access without having the UE leave the LTE network.

The legacy 2G/3G network (e.g., GSM network) includes mobile switching centers (MSCs). The MSC is the primary service delivery node for the legacy network and is responsible for routing voice calls and other services, such as facsimiles and circuit switched data. For example, MSC sets up and releases the end-to-end connection, handles mobility and hand-over requirements during the calls and takes care of charging and real-time pre-paid account monitoring. There are various different names for MSCs in different contexts. The Gateway MSC (GMSC), for instance, is the MSC that determines at which visited MSC a subscriber being called is currently located. The GMSC also interfaces with the public switched telephone network (PSTN). All mobile-to-mobile calls and PSTN-to-mobile calls are routed through the GMSC. The Visited MSC (VMSC) is the MSC where a subscriber is currently located. The Visitor Location Register (VLR) associated with the VMSC stores the data related to the subscribers roaming in the jurisdiction of the VMSC. The Home Location Register (HLR) is a central database that stores data of each authorized mobile phone subscriber.

Referring to FIG. 3A, when an incoming voice call for UE 132 camping in an LTE network arrives at gateway mobile switching center (GMSC) 302, the incoming call causes GMSC 302 to initiate send-routing-information (SRI)/provide-routing-number (PRN) procedures to locate and page UE 132. For example, GMSC 302 can send a mobile application part (MAP) send-routing-information (SRI) message to home location register (HLR) 304 to request routing information that can be used to locate and page UE 132. In some embodiments, the SRI message includes a mobile station international subscriber directory number (MSISDN) for UE 132. Because UE 132 is attached to an LTE network, HLR 304 sends a MAP provide-routing-number (PRN) message to CSFB InterWorking Function (IWF) 306, which bridges the two networks for locating and paging UE 132, to request a routing number for UE 132. In some embodiments, the MAP PRN message includes the MSISDN of UE 132. CSFB IWF 306 selects mobility management entity (MME) 120 in the LTE network that knows the location of UE 132 using the information included in the PRN message (e.g., MSISDN) and sends a paging signal for UE 132 to MME 120 through an SGs interface. MME 120 in turn pages UE 132 to alert it for the incoming voice call.

In response to receiving a page from MME 120 regarding the incoming voice call, UE 132 prepares to transition to the legacy network to receive the voice call. UE 132, for example, updates its location by sending a location update (LU) message to visited mobile switching center (VMSC) 308. This is because the location area ID (LAI) in the LTE network where UE 132 is located is different from the LAI of the area in the legacy network. VMSC 308 in turn sends an MAP update location (UL) message to HLR 304, e.g., to inform HLR 304 of the LAI of UE 132 in the legacy network. In response to receiving the MAP UL message, HLR 304 sends an MAP cancel location (CL) message to CSFB IWF 306 to invalidate the old location information of UE 132.

Referring to FIG. 3B, upon receiving the MAP CL message from HLR 304, CSFB IWF 306 sends an MAP SRI message to HLR 304. In response, HLR 304 sends an MAP PRN message to VMSC 308 to request for a routing (roaming) number. VMSC 308 responds to the MAP PRN message from HLR 304 by sending an MAP PRN Response message including a mobile station roaming number (MSRN) for UE 132 to HLR 304. HLR 304 in turn provides the MSRN to CSFB IWF 306 by sending an MAP SRI Response message (if UE 132 happens to be roaming, the SRI message must cross a network boundary). Upon receiving the MAP SRI Response message, CSFB IWF 306 sends an MAP PRN Response message including the MSRN to HLR 304 in response to the MAP PRN message from HLR 304 (identified as "3. MAP PRN" in FIG. 3A). HLR 304 in turn provides the MSRN to GMSC 302 by sending an MAP SRI Acknowledge message in response to the MAP SRI message (identified as "2. MAP SRI" in FIG. 3A) received from GMSC 302. GMSC 302, upon receiving the SRI Acknowledge message, routes the incoming voice call to VMSC 308 using the MSRN. In response, VMSC 308 pages UE 132. UE 132, which is now attached to the legacy network, receives the incoming voice call by responding to the page.

The mechanism described above in connection with FIGS. 3A-B works well in general for routing an incoming voice call to a user equipment (UE) camping in an LTE network. If the UE happens to be roaming (i.e., GMSC 302/HLR 304 and CSFB IWF 306 are not located within the same network), however, it is possible that the home signaling network may be configured to filter out the MAP SRI messages received from another network. This in turn prevents the incoming voice call from being routed to the UE. This filtering of the SRI message is performed, e.g., to prevent foreign networks from avoiding roaming charges.

Figure 4A:
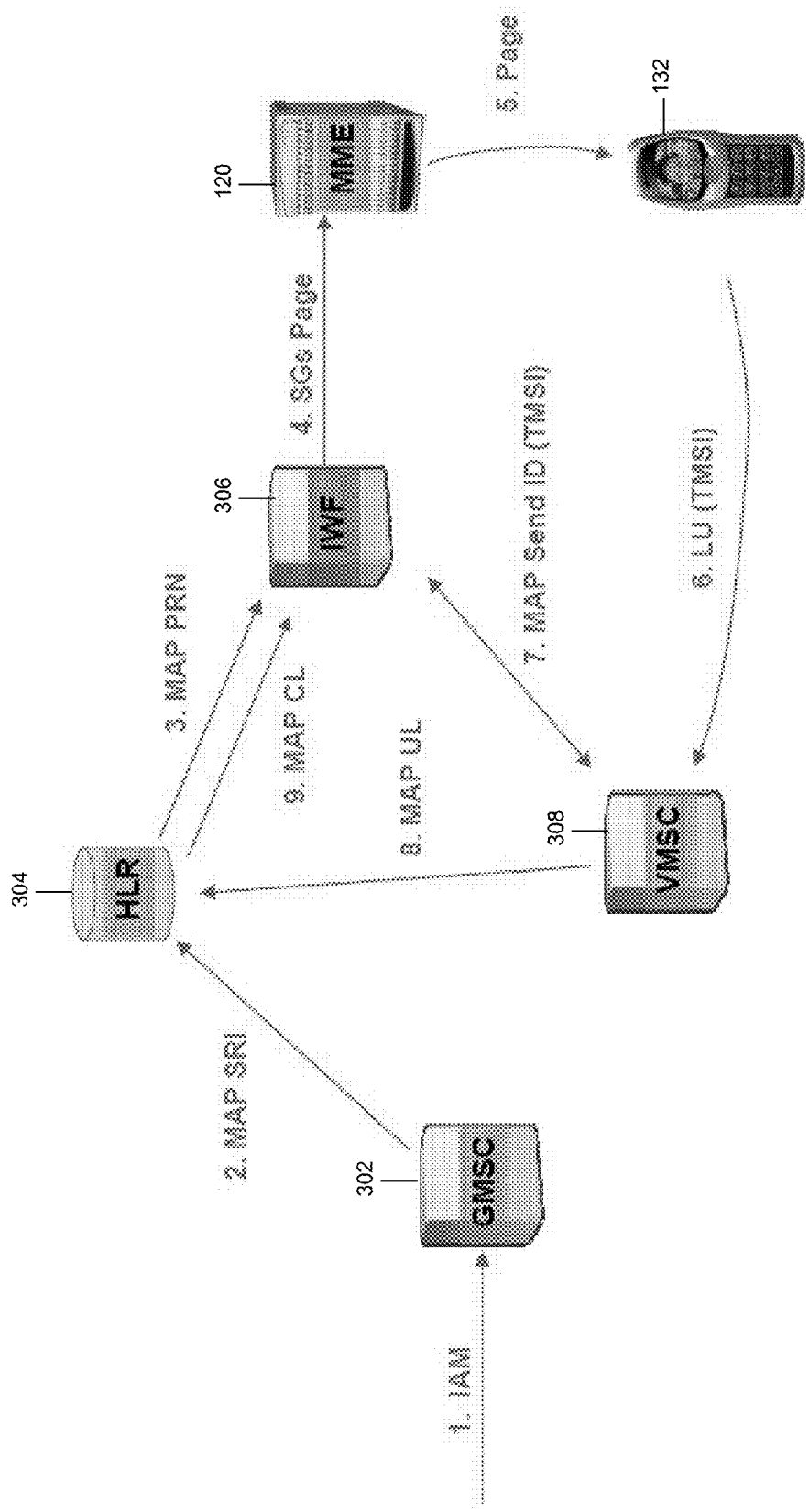
FIGS. 4A-4B show a block diagram for illustrating an enhanced mobile terminating (incoming) voice call procedure in accordance with certain embodiments.
Figure 4B:
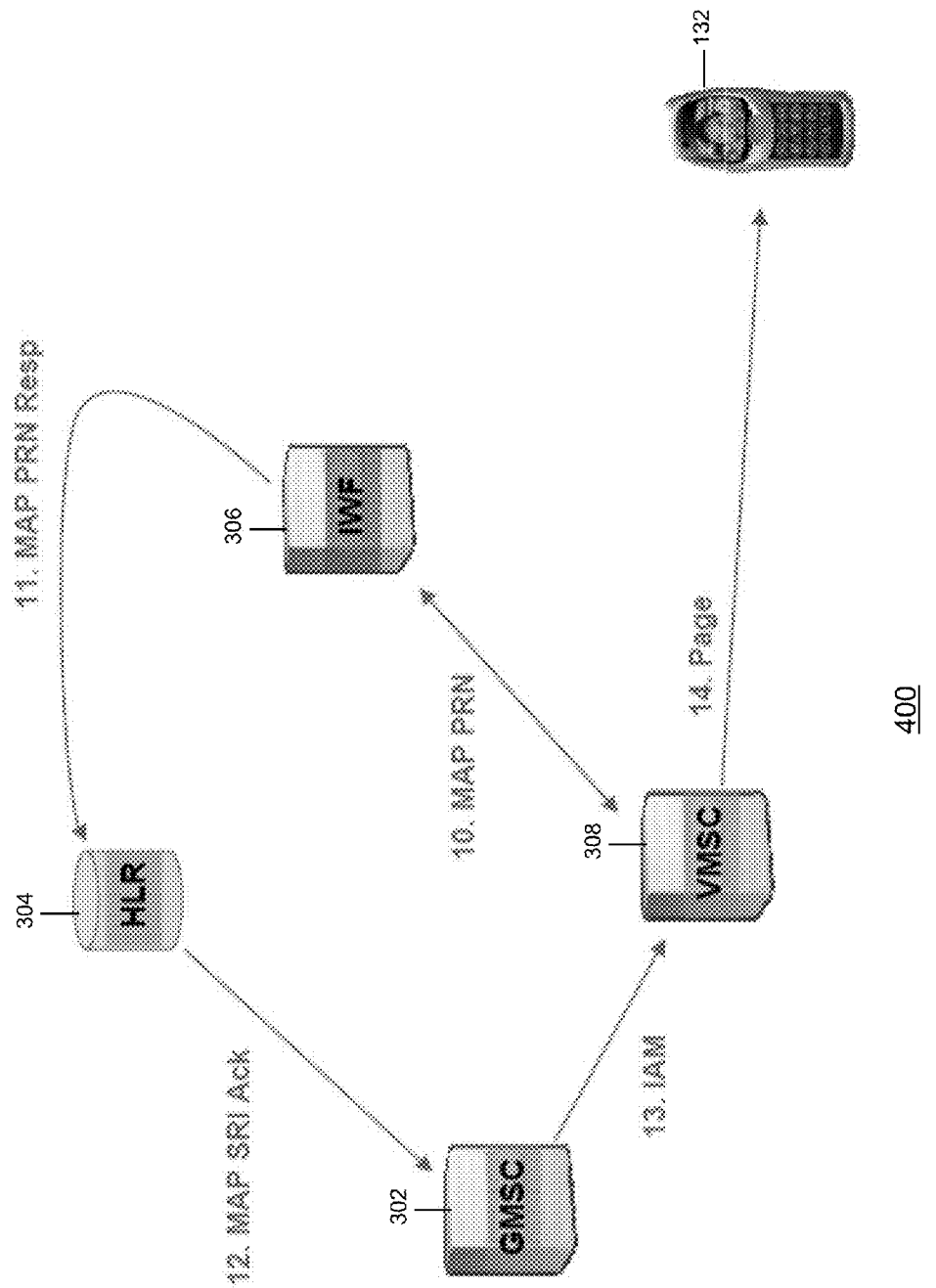

FIGS. 4A-4B show a block diagram 400 for illustrating an enhanced mobile terminating (incoming) voice call procedure using circuit-switched fallback (CSFB) interworking function in accordance with certain embodiments. The enhanced voice call procedure enables a mobile station roaming number (MSRN) of a subscriber to be retrieved without requiring signaling interactions across network boundaries (e.g., MAP SRI Response message from HLR 304 to CSFB IWF 306 as shown in FIG. 3A). The CSFB function's support for the allocation of temporary mobile subscriber identity (TMSI) to the UE that are registered with it following a combined attachment to an LTE network, as well as its support for an MAP/G interface provide rooms for an enhancement.

Referring to FIG. 4A, when an incoming voice call for UE 132 operating in an LTE network arrives at GMSC 302, GMSC 302 initiates SRI/PRN procedures to locate and page UE 132. For example, GMSC 302 can send an MAP SRI message to HLR 304 to request routing information that can be used to locate and page UE 132. In some embodiments, the SRI message includes an MSISDN for UE 132. In response, HLR 304 in turn sends an MAP PRN message to CSFB IWF 306, which bridges the two networks for locating and paging UE 132. In response to receiving the MAP PRN message, CSFB IWF 306 selects an MME (MME 120) in the LTE network that knows the location of UE 132 and sends a paging signal along with a TMSI for UE 132 to MME 120 through an SGs interface, wherein the TMSI was allocated for UE 132 when UE 132 attached to the LTE network. MME 120 in turn sends a page signal with the TMSI to UE 132.

In response to receiving a page signal from MME 120 regarding the incoming voice call, UE 132 prepares to transition to the legacy network to receive the voice call. UE 132, for example, updates its location by sending a LU message including the allocated TMSI to VMSC 308 (also referred to as "MSC/VLR"). VMSC 308, which maintains an MAP/G interface configured towards CSFB IWF 306, sends an MAP Send ID message including the address of VMSC 308 and the TMSI that it received from UE 132 to CSFB IWF 306. In response to the MAP Send ID message, CSFB IWF 306 sends an MAP Send ID Acknowledge message including an international mobile subscriber identity (IMSI) for UE 132. VMSC 308 next sends an MAP UL message including the IMSI to HLR 304. In some embodiments, the MAP UL message also includes the LAI of UE 132 in the legacy network. In response to receiving the MAP UL message, HLR 304 sends an MAP cancel location (CL) message to CSFB IWF 306 to invalidate the old location information of UE 132 (e.g., LAI of UE 132 in the LTE network).

Referring to FIG. 4B, upon receiving the MAP CL message, CSFB IWF 306 sends a MAP PRN message to VMSC 308 to request for routing information that can be used to locate and page UE 132. In response to receiving the MAP PRN message, VMSC 308 sends an MAP PRN Acknowledge message including an MSRN of UE 132. CSFB IWF 306 then sends an MAP PRN Response message including the MSRN to HLR 304 in response to the MAP PRN message from HLR 304 (identified as "3. MAP PRN" in FIG. 4A). HLR 304 in turn provides the MSRN to GMSC 302 by sending an MAP SRI Acknowledge message in response to the MAP SRI message from GMSC 302 (identified as "2. MAP SRI" in FIG. 4A). GMSC 302, upon receiving the SRI Acknowledge message, routes the incoming voice call to VMSC 308 using the MSRN. In response, VMSC 308 sends a page UE 132. UE 132, which is now tuned to the legacy network, receives the incoming voice call by responding to the page.

Because CSFB IWF 306 can, using the MAP/G interface and the allocated TMSI, request for and receive a MSRN for UE 132 (along with the address of VMSC 308) directly from VMSC 308 (instead through HLR 304), CSFB IWF 306 no longer needs to receive an MAP SRI message (e.g., MAP SRI Response message) from HLR 304 (as shown in FIG. 4B). In other words, because the hosting Mobile Switching Center (MSC)/visitor location register (VLR) (i.e., VMSC 308) can be identified without having to query the HLR 304, all the signal interactions can remain within a local network.

Figure 5:
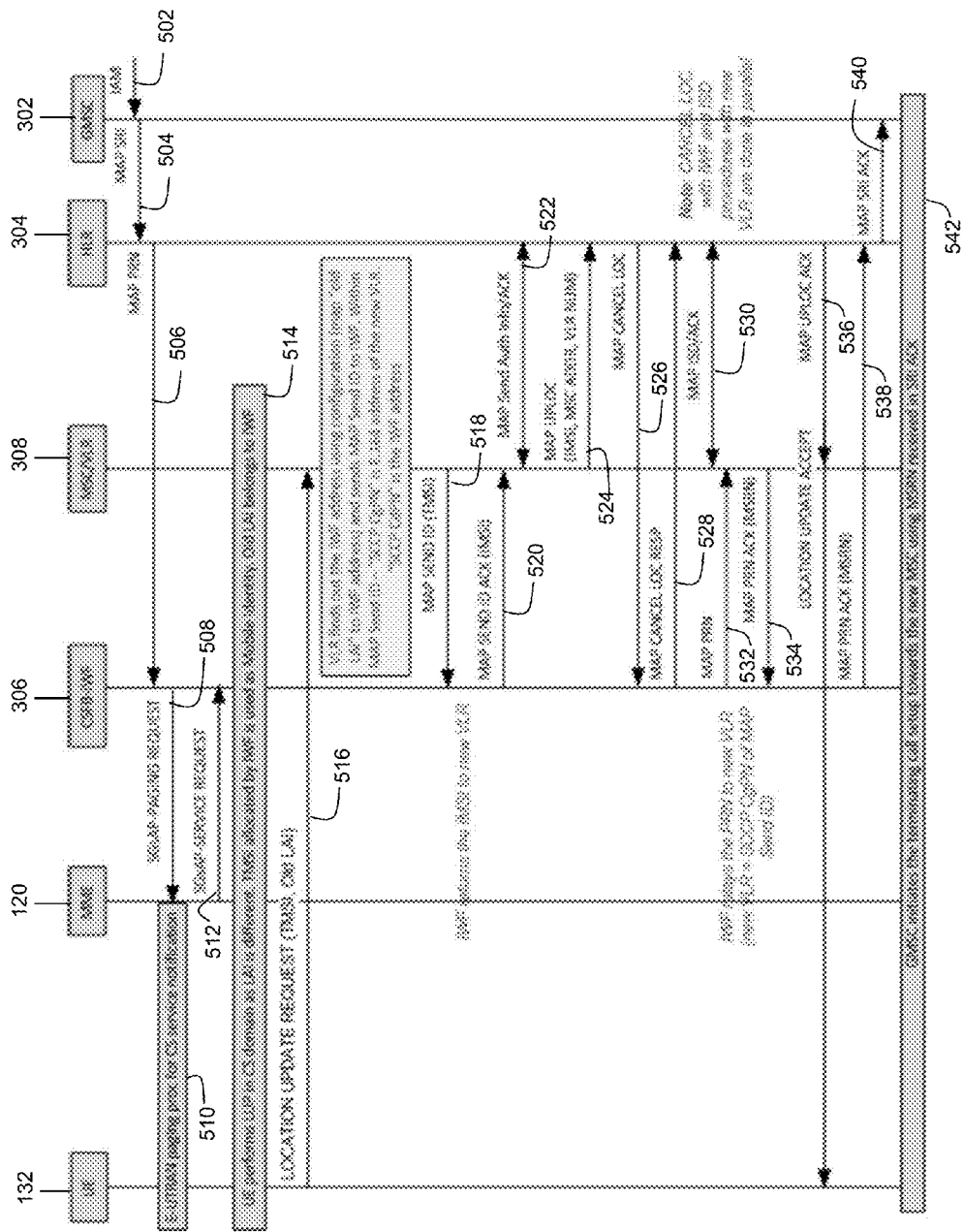
FIG. 5 is a call flow diagram for illustrating an enhanced mobile terminating (incoming) voice call procedure in accordance with certain embodiments.

FIG. 5 is a call flow diagram 500 for illustrating an enhanced mobile terminating (incoming) voice call procedure using circuit-switched fallback (CSFB) function in accordance with certain embodiments. Referring to FIG. 5, an initial address message (IAM) 502 for an incoming voice call is received at a gateway mobile switching center (GMSC) 302 for a user equipment (UE) 132 that is attached to a long term evolution (LTE) network. In some embodiments, the IAM 502 includes a mobile station international subscriber directory number (MSISDN) for UE 132. In response, GMSC 302 sends a mobile application part (MAP) send-routing-information (SRI) message 504 to a home location register (HLR) 304 to request for routing information that can be used to locate and page UE 132. HLR 304 in turn sends a MAP provide-routing-number (PRN) message 506 to a circuit-switched fallback interworking function (CSFB-IWF) 306 to request a routing number for UE 132. CSFB-IWF 306 selects a mobile management entity (MME) 120 that can locate and page UE 132 in the LTE network and sends an SGs application part (SGsAP) paging request 508 to MME 120 along with a TMSI that was allocated for UE 132 when UE 132 attached to the LTE network. In response, MME 120 initiates an evolved UMTS terrestrial radio access (E-UTRAN) paging procedure 510 for circuit-switched (CS) service notification to page UE 120 and sends the allocated TMSI. MME 120 sends an SGsAP service request 512 to CSFB-IWF 306 in response to SGsAP paging request 508 after UE 132 receives the page and the TMSI.

Upon receiving the page and the TMSI, UE 132 prepares to transition to the legacy network to receive the voice call. For example, UE 132 performs a location update procedure 514 in the circuit switched domain. This is because the location area ID (LAI) of UE 132 in the LTE network could be different from the LAI of UE 132 in the circuit-switched domain (old LAI). In some embodiments, the TMSI allocated to UE 132 by CSFB-IWF 306 is used as a mobile identity of UE 132. UE 132, for instance, sends an MAP location update (LU) message 516 including the TMSI and the old LAI to a mobile switching center (MSC)/visitor location register (VLR) 308 (also referred to as visited mobile switching center (VMSC)). In some embodiments, MSC/VLR 308 finds out the address of CSFB-IWF 306 using the old LAI. For example, MSC/VLR 308 can map the old LAI to the CSFB-IWF 306 address. Having identified the address of CSFB-IWF 306, MSC/VLR 308 sends an MAP Send ID message 518 including the TMSI for UE 132 to CSFB-IWF 306. In response, CSFB-IWF 306 sends an MAP Send ID Acknowledge message 520 including an international mobile subscriber identity (IMSI) to MSC/VLR 308. MSC/VLR 308 also sends an MAP Send Authentication Info message 522a to, and receives MAP Send Authentication Info Acknowledge message 522b from, HLR 304.

Next, MSC/VLR 308 sends an MAP update location (UL) message 524 including the IMSI, the TMSI, and an identifier of the associated VLR to HLR 304. In response, HLR 304 sends an MAP cancel location (CL) message 526 to CSFB-IWF 306, e.g., to invalidate the old location of UE 132. In response, CSFB-IWF 306 sends an MAP CL Acknowledge message 528 to HLR 304. HLR 304 also sends an MAP insert subscriber data (ISD) message 530a to, and receives an MAP ISD Acknowledge 530b from, MSC/VLR 308. CSFB-IWF 306 next sends an MAP PRN message 532 to MSC/VLR 308 to request for a routing number that can be used to locate and page UE 132. In response, MSC/VLR 308 sends an MAP PRN Acknowledge message 534 including a mobile station roaming number (MSRN) for UE 132. HLR 304 sends an MAP update location (UL) Acknowledge message 536 to MSC/VLR 308 in response to the MAP UL message 524 to accept the updated location. MSC/VLR 308 then forwards the MAP UL Acknowledge message 536 to UE 132 in response to the MAP LU message 516.

CSFB-IWF 306 next sends an MAP PRN Acknowledge message 538 including the MSRN of UE 132 to HLR 304 in response to the MAP PRN message 506. HLR 304 in turn sends an MAP SRI Acknowledge message 540 including the MSRN to GMSC 302 in response to the MAP SRI message 504. GMSC 302 then initiates a terminating (incoming) voice call set up 542 with MSC/VLR 308 using the MSRN. MSC/VLR 308 next sends a page to UE 132 and UE 132 receives the incoming voice call when it responds to the page.

User Equipment and Network Device

Figure 6:
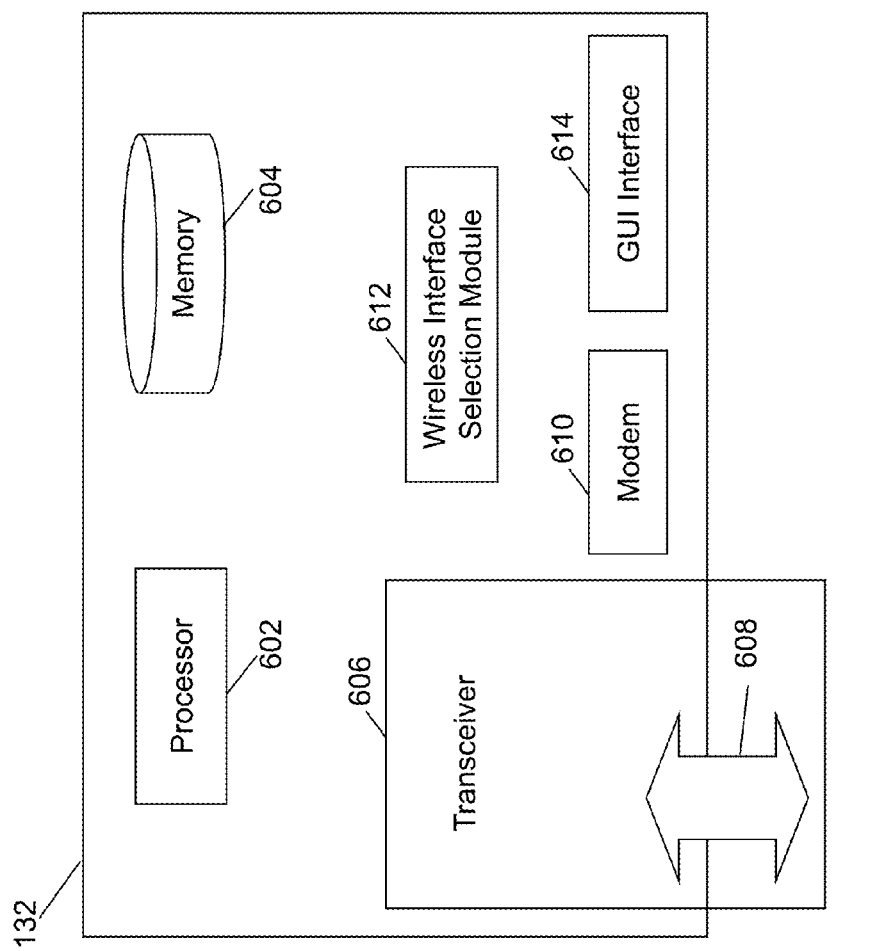
FIG. 6 shows a logical diagram of a user equipment in accordance with certain embodiments.

FIG. 6 illustrates a logical view 600 of user equipment (UE) 132 in accordance with certain embodiments. The UE 132 can include a processor 602, a memory 604, a transceiver 606 including an interface 608, a modem 610, a wireless interface selection module 612, and a GUI interface 614.

The transceiver 606 includes a transmitter and a receiver. The transmitter and the receiver can be integrated into a single chip or can be embodied in separate chips. The transceiver 606 can also include an interface 608 that provides an input and/or output mechanism to communicate with other network devices. The interface 608 can measure the wireless signal strengths of wireless interfaces such as base stations and access points. The interface 608 can be implemented in hardware to send and receive signals in a variety of mediums, such as optical, copper, and wireless, and in a number of different protocols some of which may be non-transient.

The modem 610 is configured to implement modulation and framing of signals according to one or more communication standards. The communication standards include the cellular standards defined under 3GPP.

The wireless interface selection module 612 is configured to select a wireless interface from which to receive network services. The wireless interfaces can include interfaces to different types of communication networks, including cellular networks and WLANs. Cellular networks can include LTE networks. A wireless interface for LTE networks can include a base station such as an eNodeB; a wireless interface for WLANs can include an access point.

The wireless interface selection module 612 can select the serving wireless interface by analyzing data load information associated with wireless interfaces. In certain embodiments, the wireless interface selection module 612 can be configured to attach to a wireless interface handling the least amount of data traffic and/or with more available resources. In certain embodiments, the wireless interface selection module 612 can also analyze additional information to decide to which wireless interface to connect. For example, the wireless interface selection module 612 can use one or more of the following: the load condition associated with the candidate wireless interfaces, the wireless signal strength associated with the candidate wireless interfaces, and a configuration status on the wireless interface selection module 612 indicating whether the UE 132 favors the cellular network or the WLAN.

The wireless interface selection module 612 can be implemented in software using memory 604 such as a non-transitory computer readable medium, a programmable read only memory (PROM), or flash memory. The software can run on a processor 602 that executes instructions or computer code. The wireless interface selection module 612 may also be implemented in hardware using an application specific integrated circuit (ASIC), programmable logic array (PLA), or any other integrated circuit.

The GUI interface 614 can provide communication with an input and/or output mechanism to communicate with UE users. UE users can use input/output devices to send/receive data to/from the UE 132 over the GUI interface 614. Input/output devices can include, but are not limited to, a keyboard, a screen, a touch screen, a monitor, and a mouse. The GUI interface 614 can operate under a number of different protocols. The GUI interface 614 can be implemented in hardware to send and receive signals in a variety of mediums, such as optical, copper, and wireless.

The UE 132 described above can communicate with a plurality of radio access networks using a plurality of access technologies and with wired communication networks. The UE 132 can be a smart phone offering advanced features and capabilities, such as word processing, web browsing, gaming, e-book capabilities, an operating system, and a full keyboard. The UE 132 may run an operating system such as Symbian OS, iPhone OS, RIM's Blackberry, Windows Mobile, Linux, Palm WebOS, and Android. The screen may be a touch screen that can be used to input data to the UE 132 and the touch screen can be used instead of the full keyboard. The UE 132 may have the capability to run applications or communicate with applications that are provided by servers in the communication network. The UE 132 can receive updates and other information from these applications on the network.

The UE 132 also encompasses many other devices such as televisions (TVs), video projectors, set-top boxes or set-top units, digital video recorders (DVR), computers, netbooks, laptops, and any other audio/visual equipment that can communicate with a network. The UE 132 can also keep global positioning coordinates, profile information, or other location information in its stack or memory. The UE 132 can have a memory such as a computer readable medium, flash memory, a magnetic disk drive, an optical drive, a programmable read-only memory (PROM), and/or a read-only memory (ROM). The UE 132 can be configured with one or more processors 602 that process instructions and run software that may be stored in memory 604. The processor 602 can also communicate with the memory 604 and interfaces to communicate with other devices. The processor 602 can be any applicable processor such as a system-on-a-chip that combines a CPU, an application processor, and flash memory. The interfaces can be implemented in hardware or software. The interfaces can be used to receive both data and control information from the network as well as local sources, such as a remote control to a television. The UE 132 can also provide a variety of user interfaces (e.g., GUI Interface 614) such as a keyboard, a touch screen, a trackball, a touch pad, and/or a mouse. The UE 132 may also include speakers and a display device in some embodiments.

The interworking between a cellular network and a WLAN can be implemented, at least in part, in a network device in some embodiments. This network device can implement multiple and different integrated functionalities. In some embodiments, one or more of the following functionalities can be implemented on the network device including a security gateway (SeGW), an access gateway, a Gateway General packet radio service Serving Node (GGSN), a serving GPRS support node (SGSN), a packet data inter-working function (PDIF), an access service network gateway (ASNGW), a User Plane Entity (UPE), an IP Gateway, a session initiation protocol (SIP) server, a proxy-call session control function (P-CSCF), and an interrogating-call session control function (I-CSCF), a serving gateway (SGW), and a packet data network gateway (PDN GW), a mobility management entity (MME), a mobility access gateway (MAG), an HRPD serving gateway (HSGW), a local mobility anchor (LMA), a packet data serving node (PDSN), a foreign agent (FA), and/or home agent (HA). The CVR scheme can be implemented on network devices of the same type, implementing the same set of functionalities.

In certain embodiments, the functionalities are provided by a combination of hardware and software in the network device. General purpose hardware can be configured in the network device to provide one or more of these specialized functionalities. The gateway can also support sessions originated from a Femto base station, which would connect to the gateway using a broadband network. A person or corporation may use a Femto base station in a home or business to support one or more mobile nodes. The gateway can provide trigger based traffic management during a handoff from a Femto base station to a macro base station, while maintaining traffic management for the mobile node. The offload gateway can be implemented as any combination of the following including an xGSN, an xGW, an xGW-SGW, and an xGW-PGW.

Figure 7:
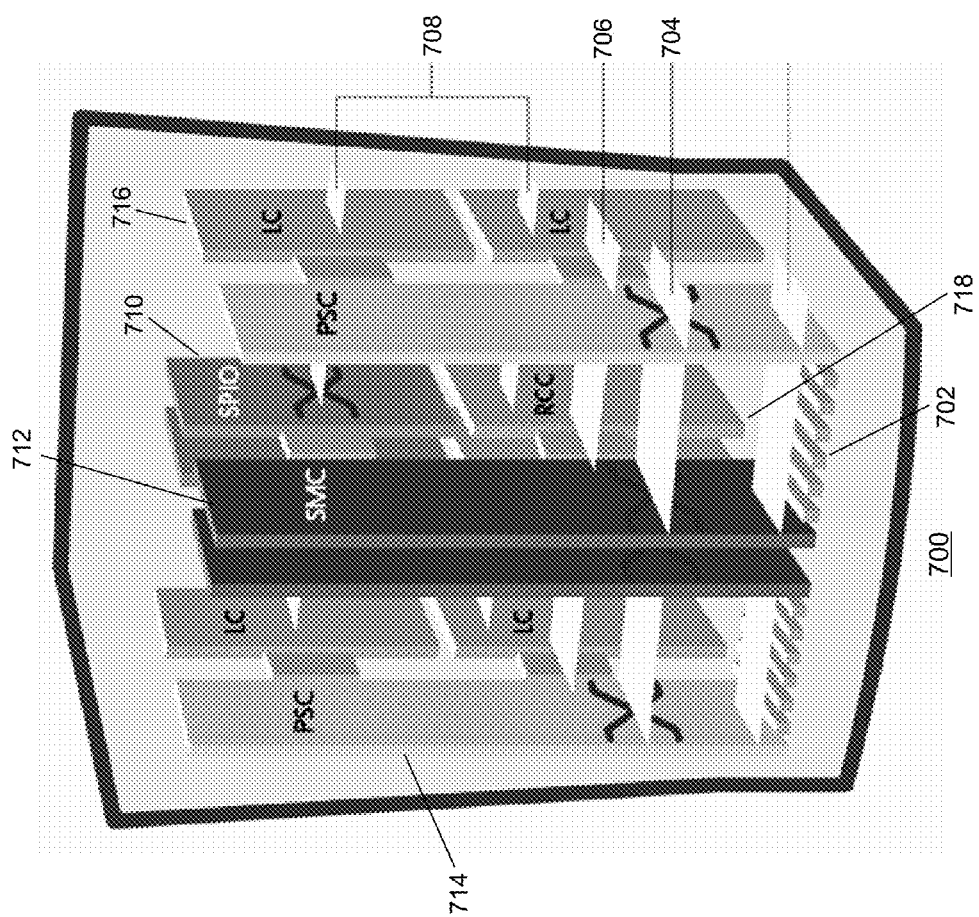
FIG. 7 illustrates a network device in accordance with certain embodiments.

In some embodiments the network device is implemented using a collection of integrated circuit boards or cards. These cards include input/output interfaces for communication amongst each other, at least one processor for executing instructions and running modules that are stored in memory, and memory for storing data. The features of a network device that implements a gateway, in accordance with some embodiments, are further described below. FIG. 7 illustrates the implementation of a network device 700 in accordance with some embodiments. The network device 700 includes slots 702 for loading application cards and line cards. A midplane can be used in the network device 700 to provide intra-network device communications, power connections, and transport paths between the various installed cards. The midplane can include buses such as a switch fabric 704, a control bus 706, a system management bus, a redundancy bus 708, and a time division multiplex (TDM) bus. The switch fabric 704 is an IP-based transport path for user data throughout the network device 700 implemented by establishing inter-card communications between application cards and line cards. The control bus 706 interconnects the control and management processors within the network device 700. The network device management bus provides management of system functions such as supplying power, monitoring temperatures, board status, data path errors, card resets, and other failover features. The redundancy bus 708 provides transportation of user data and redundancy links in the event of hardware failures. The TDM bus provides support for voice services on the system.

The network device 700 supports at least four types of application cards: a switch processor I/O card (SPIO) 710, a system management card (SMC) 712, a packet service card (PSC) 714, and a packet accelerator card (not shown). Other cards used in the network device 700 include line cards 716 and redundant crossbar cards (RCC) 718. The line cards 716, when loaded in the network device 700, provide input/output connectivity to the network and other devices, as well as redundancy connections. The line cards 716 include interfaces to the network through Ethernet, Fiber Optic, and/or any other communication mediums. The redundant crossbar card (RCC) 718 includes a non-blocking crossbar and connections to each of the cards in the network device 700. This allows a redundant connection to be made through the redundant crossbar card 718 from any one card to any other card in the network device 700. The SPIO card 710 serves as a controller of the network device 700 and is responsible for such things as initializing the network device 700 and loading software configurations onto other cards in the network device 700.

The system management card (SMC) 712 and switch processor card (not shown) are system control and management cards for managing and controlling other cards in the network device 700. The packet accelerator card (PAC) and packet service card (PSC) 714 provide packet processing, context processing capabilities, and forwarding capabilities among other things. The PAC and PSC 714 perform packet-processing operations through the use of control processors and a network processing unit. The network processing unit determines packet processing requirements; receives and transmits user data frames to/from various physical interfaces; makes IP forwarding decisions; implements packet filtering, flow insertion, deletion, and modification; performs traffic management and traffic engineering; modifies/adds/strips packet headers; and manages line card ports and internal packet transportation. The control processors, also located on the packet accelerator card, provide packet-based user service processing.

The operating system software can be based on a Linux software kernel and run specific applications in the network device 700 such as monitoring tasks and providing protocol stacks. The software allows network device resources to be allocated separately for control and data paths. For example, certain packet accelerator cards and packet services cards can be dedicated to performing routing or security control functions, while other packet accelerator cards/packet services cards are dedicated to processing user session traffic. As network requirements change, hardware resources can be dynamically deployed to meet the requirements in some embodiments. The system can be virtualized to support multiple logical instances of services, such as technology functions (e.g., a SeGW PGW, SGW, MME, HSGW, PDSN, ASNGW, PDIF, HA, or GGSN).

The software in the network device 700 can be divided into a series of tasks that perform specific functions. These tasks communicate with each other as needed to share control and data information throughout the network device 700. A task is a software process that performs a specific function related to system control or session processing. Three types of tasks operate within the network device 700 in some embodiments: critical tasks, controller tasks, and manager tasks. The critical tasks control functions that relate to the ability of the network device 700 to process calls such as network device initialization, error detection, and recovery tasks. The controller tasks mask the distributed nature of the software from the user and perform tasks such as monitoring the state of subordinate manager(s), providing for intra-manager communication within the same subsystem, and enabling inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a network device (e.g., network device 700) include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the network device by monitoring the various software and hardware components of the network device. Recovery control task subsystem is responsible for executing a recovery action for failures that occur in the network device and receives recovery actions from the high availability task subsystem. Processing tasks are distributed into multiple instances running in parallel so if an unrecoverable software fault occurs, the entire processing capabilities for that task are not lost. User session processes can be sub-grouped into collections of sessions so that if a problem is encountered in one sub-group users in another sub-group will not be affected by that problem.

The architecture also allows check-pointing of processes, which is a mechanism to protect the system against any critical software processes that may fail. The self-healing attributes of the software architecture protects the system by anticipating failures and instantly spawning mirror processes locally or across card boundaries to continue the operation with little or no disruption of service. This unique architecture allows the system to perform at the highest level of resiliency and protects the user's data sessions while ensuring complete accounting data integrity.

Shared configuration task subsystem provides the network device with an ability to set, retrieve, and receive notification of network device configuration parameter changes and is responsible for storing configuration data for the applications running within the network device. A resource management subsystem is responsible for assigning resources (e.g., processor and memory capabilities) to tasks and for monitoring the task's use of the resources.

Virtual private network (VPN) subsystem manages the administrative and operational aspects of VPN-related entities in the network device, which include creating separate VPN contexts, starting IP services within a VPN context, managing IP pools and subscriber IP addresses, and distributing the IP flow information within a VPN context. In some embodiments, within the network device, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards.

The session subsystem is responsible for processing and monitoring a mobile subscriber's data flows in some embodiments. Session processing tasks for mobile data communications include: S1/S5/S8 interface termination for LTE networks, A 10/All interface termination for CDMA networks, GSM tunneling protocol (GTP) termination for GPRS and/or UMTS networks, asynchronous PPP processing, IPsec, packet filtering, packet scheduling, Diffserv codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

In providing emulation, as MIPv4 is received from a mobile node (e.g., user equipment 132), the session subsystem can setup a MIPv4 termination and setup a PMIPv6 session towards the core network. A session manager can track the mapping of the sessions and processing to provide the emulation and inter-working between the networks. A database can also be used to map information between the sessions, and store, for example, NAI, HoA, AE information in some embodiments.

Figure 8:
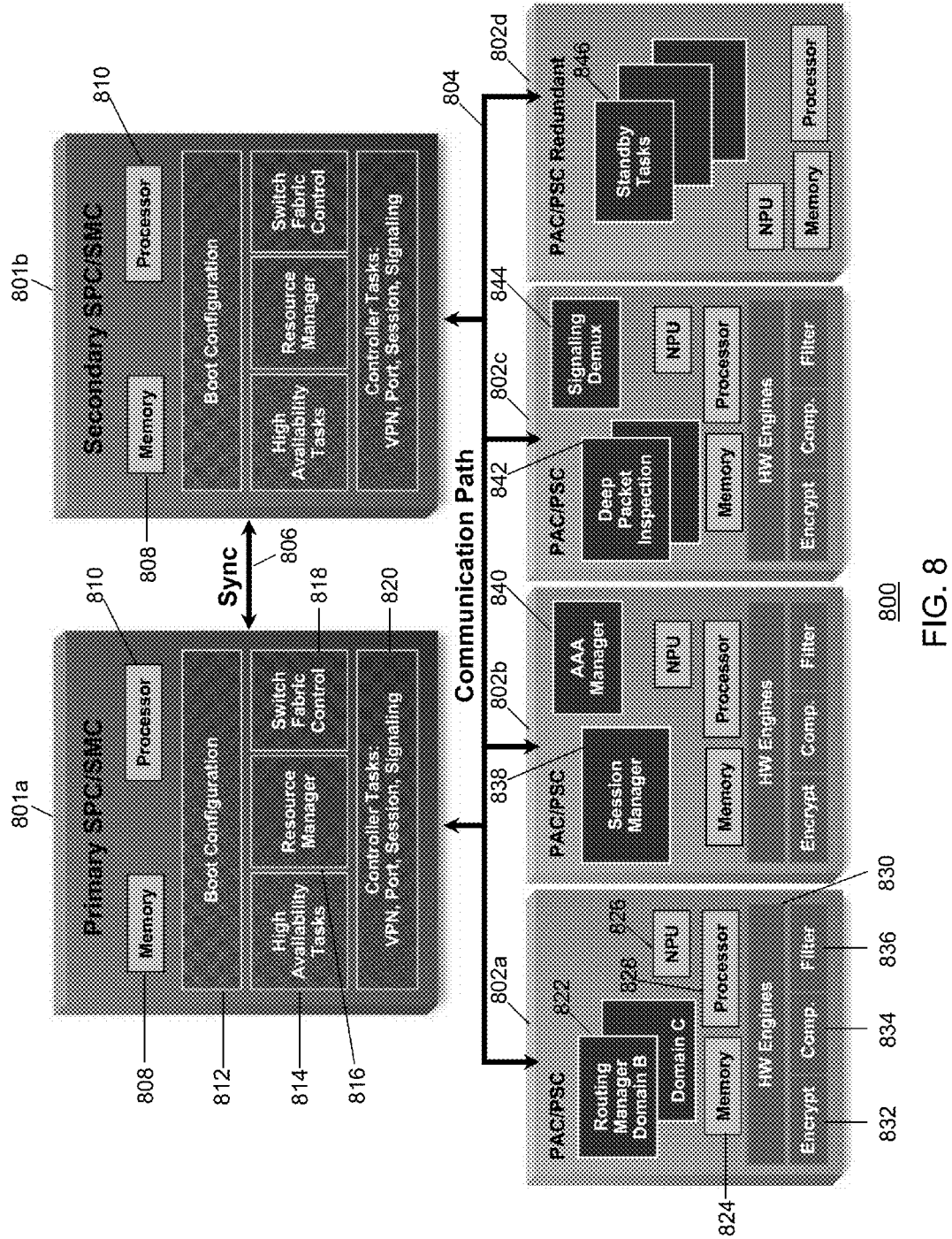
FIG. 8 illustrates a logical view of the software architecture of a network device in accordance with certain embodiments.

The network device allows system resources to be allocated separately for control and data paths. For example, certain PACs/PSCs could be dedicated to performing routing or security control functions while other PACs/PSCs are dedicated to processing user session traffic. As network requirements grow and call models change, hardware resources can be added to accommodate processes, such as encryption, packet filtering, etc., that require more processing power. FIG. 8 illustrates a logical view 800 of the software architecture of a network device (e.g., network device 700) in accordance with certain embodiments. As shown, the software and hardware can be distributed within the network device and across different circuit boards, processors, and memory. FIG. 8 includes a primary switch processor card (SPC)/system management card (SMC) 801a, a secondary SPC/SMC 801b, PAC/PSC 802a-802d, a communication path 804, and a synchronization path 806. The primary SPC/SMC 801a and the secondary SPC/SMC 801b each includes a memory 808, a processor 810, a boot configuration 812, high availability tasks 814, resource manager 816, switch fabric control 818, and controller tasks 820.

The SPC/SMC 801 manages and controls the network device including the other cards in the network device. The SPC/SMC 801 can be configured in a primary and secondary arrangement that provides redundancy and failsafe protection. The modules or tasks running on the SPC/SMC 801 are related to network device wide control and management. The boot configuration task 812 includes information for starting up and testing the network device. The network device can also be configured to startup in different configurations and providing different implementations. These can include which functionalities and services are capable of running on the SPC/SMC 801. The high availability task 814 maintains the operational state of the network device by monitoring the device and managing recovery efforts to avoid disruption of service. The resource manager tracks and assigns the available resources for sessions and demands on the network device. This can include load balancing among different processors and tasks running on the network device. Processes can be distributed across the system to fit the needs of the network model and specific process requirements. For example, most tasks can be configured to execute on SPC/SMC 801 or a PAC/PSC 802, while some processor intensive tasks can also be performed across multiple PACs/PSCs to utilize multiple CPU resources. Distribution of these tasks is invisible to the user. The switch fabric control 818 controls the communication paths in the network device. The controller tasks module 820 can manage the tasks among the resources of the networks to provide, for example, VPN services, assign ports, and create, delete, and modify sessions for UE 132.

The PAC/PSC 802 is a high-speed processing card that is designed for packet processing and the tasks involved with providing various network functionalities on the network device. The PAC/PSC 802 include a memory 824, a network processing unit (NPU) 826, a processor 828, a hardware engine 830, an encryption component 832, a compression component 834, and a filter component 836. Hardware engines 830 can be deployed with the card to support parallel distributed processing for compression, classification traffic scheduling, forwarding, packet filtering, and statistics compilations. The components can provide specialize processing that can be done more efficiently than using a general processor in some embodiments.

Each PAC/PSC 802 is capable of supporting multiple contexts. The PAC/PSC 802 is also capable of running a variety of tasks or modules. PAC/PSC 802a provides routing managers 822 with each covering routing of a different domain. PAC/PSC 802b provides a session manager 838 and an AAA manager 840. The session manager 838 manages one or more sessions that correspond to one or more UE 132. A session allows a UE 132 to communicate with the network for voice calls and data. The AAA manager 840 manages accounting, authentication, and authorization with an AAA server in the network. PAC/PSC 802 provides a DPI task 842 and a signaling demux 844. The DPI task 842 provides inspection of packet information beyond layer 4 for use and analysis by the network device. The signaling demux 844 can provide scalability of services in combination with other modules. PAC/PSC 802d provides redundancy through standby tasks 846. Standby tasks 846 store state information and other task information so that the standby task can immediately replace an active task if a card fails or if there is a scheduled event to remove a card.

In some embodiments, the software needed for implementing a process or a database includes a high level procedural or an object-orientated language such as C, C++, C#, Java, or Perl. The software may also be implemented in assembly language if desired. Packet processing implemented in a network device can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Other embodiments are within the following claims.

What is claimed is:

1. A method comprising:
receiving at a circuit-switched fallback interworking function (CSFB-IWF) a request to provide routing information for a user equipment (UE) for which an incoming voice call is received, wherein the request is received from a home location register (HLR) and includes an identifier of the UE and wherein the UE is operating in a long term evolution (LTE) network;
sending from the CSFB-IWF a page signal along with a temporary mobile subscriber identity (TMSI) for the UE to a mobility management entity (MME) in the LTE network that can locate the UE, wherein the TMSI is allocated for the UE when the UE attaches to the LTE network and wherein the page signal causes the UE to switch to a legacy network, including a 3G network;
detecting at the CSFB-IWF a mobile switching center (MSC) that hosts the UE and is located in the legacy network;
receiving at the CSFB-IWF a mobile station roaming number (MSRN) for the UE from the hosting MSC; and
sending from the CSFB-IWF to the HLR a first message including the MSRN in response to the request such that the MSRN can be used to route the incoming voice call to the UE.

2. The method of claim 1, further comprising selecting the MME using the UE identifier.

3. The method of claim 1, wherein the detecting the MSC hosting the UE includes receiving at the CSFB-IWF from the hosting MSC a second message including the TMSI that was allocated by the CSFB-IWF for the UE.

4. The method of claim 3, wherein the hosting MSC identifies an address of the CSFB-IWF using a location information of UE in the LTE network that is received from the UE after the UE switches to the legacy network.

5. The method of claim 1, further comprising receiving at the CSFB-IWF a third message from the HLR for canceling a location of UE in the LTE network that is stored in the HLR.

6. The method of claim 5, wherein the third message includes a mobile application part (MAP) cancel location (CL) message and wherein the HLR sends the MAP CL message in response to receiving a mobile application part (MAP) update location (UL) message from the hosting MSC.

7. The method of claim 1, wherein the incoming voice call is received at a gateway mobile switching center (GMSC), wherein the first message is sent to the GMSC from the CSFB-IWF and wherein the GMSC routes the incoming voice call to the UE using the MSRN included in the first message.

8. The method of claim 1, wherein the page signal and the TMSI are sent from the CSFB-IWF to the MME via an SGs interface.

9. The method of claim 1, wherein the request includes a mobile application part (MAP) provide-routing-number (PRN) message and the first message includes an MAP PRN Response message.

10. The method of claim 1, wherein the hosting MSC sends the MSRN to the CSFB-IWF in response to a mobile application part (MAP) provide routing number (PRN) message sent from the CSFB-IWF.

11. The method of claim 1, wherein the UE sends an update location message including the TMSI to the hosting MSC upon switching to the legacy network.

12. The method of claim 1, wherein the hosting MSC sends the MSRN to the CSFB-IWF via a MAP/G interface configured towards the CSFB-IWF.

13. A network device comprising:
a memory capable of storing data; and
a processor configured for using the data such that the network device can:
receive from a home location register (HLR) a request to provide routing information for a user equipment (UE) for which an incoming voice call is received, wherein the request includes an identifier of the UE and wherein the UE is operating in a long term evolution (LTE) network;
send a page signal along with a temporary mobile subscriber identity (TMSI) for the UE to a mobility management entity (MME) in the LTE network that can locate the UE, wherein the TMSI is allocated for the UE when the UE attaches to the LTE network and wherein the page signal causes the UE to switch to a legacy network, including a 3G network;
detect a mobile switching center (MSC) that hosts the UE and is located in the legacy network;
receive a mobile station roaming number (MSRN) for the UE from the hosting MSC; and
send to the HLR a first message including the MSRN in response to the request such that the MSRN can be used to route the incoming voice call to the UE.

14. The network device of claim 13, wherein the network device includes a circuit-switched fallback interworking function (CSFB-IWF).

15. The network device of claim 13, wherein the processor is further configured for using the data such that the network device can select the MME using the UE identifier.

16. The network device of claim 13, wherein the page signal and the TMSI are sent to the MME via an SGs interface.

17. The network device of claim 13, wherein the UE sends an update location message including the TMSI to the hosting MSC upon switching to the legacy network.

18. The network device of claim 13, wherein the network device detects the host MSC when receiving from the hosting MSC a second message including the TMSI that was allocated for the UE.

19. The network device of claim 18, wherein the second message includes a mobile application part (MAP) send-ID message.

20. The network device of claim 13, wherein the request includes a mobile application part (MAP) provide-routing-number (PRN) message and the first message includes an MAP PRN Response message.

21. A computer program product residing on a non-transitory computer-readable medium, the computer program product comprising computer executable code which, when executed by one or more processors, causes the one or more processors to perform a method comprising:
receiving at a circuit-switched fallback interworking function (CSFB-IWF) a request to provide routing information for a user equipment (UE) for which an incoming voice call is received, wherein the request is received from a home location register (HLR) and includes an identifier of the UE and wherein the UE is operating in a long term evolution (LTE) network;
allocating at the CSFB-IWF a temporary mobile subscriber identity (TMSI) for the UE;
sending from the CSFB-IWF a page signal along with a temporary mobile subscriber identity (TMSI) for the UE to a mobility management entity (MME) in the LTE network that can locate the UE, wherein the TMSI is allocated for the UE when the UE attaches to the LTE network and wherein the page signal causes the UE to switch to a legacy network, including a 3G network;

detecting at the CSFB-IWF a mobile switching center (MSC) that hosts the UE and is located in the legacy network;

receiving at the CSFB-IWF a mobile station roaming number (MSRN) for the UE from the hosting MSC; and sending from the CSFB-IWF to the HLR a first message including the MSRN in response to the request such that the MSRN can be used to route the incoming voice call to the UE.

\* \* \* \* \*